UNITED STATES PATENT OFFICE.

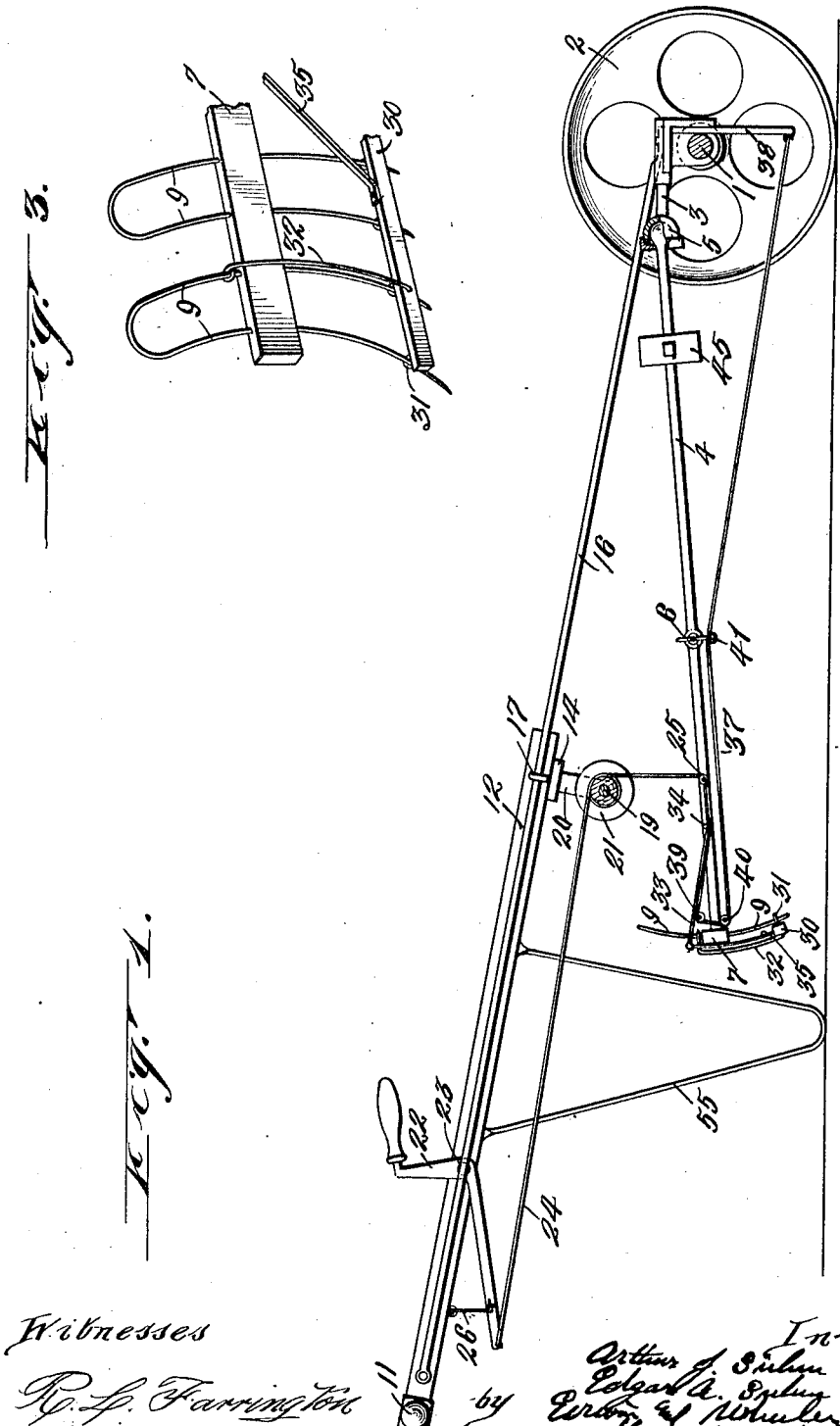

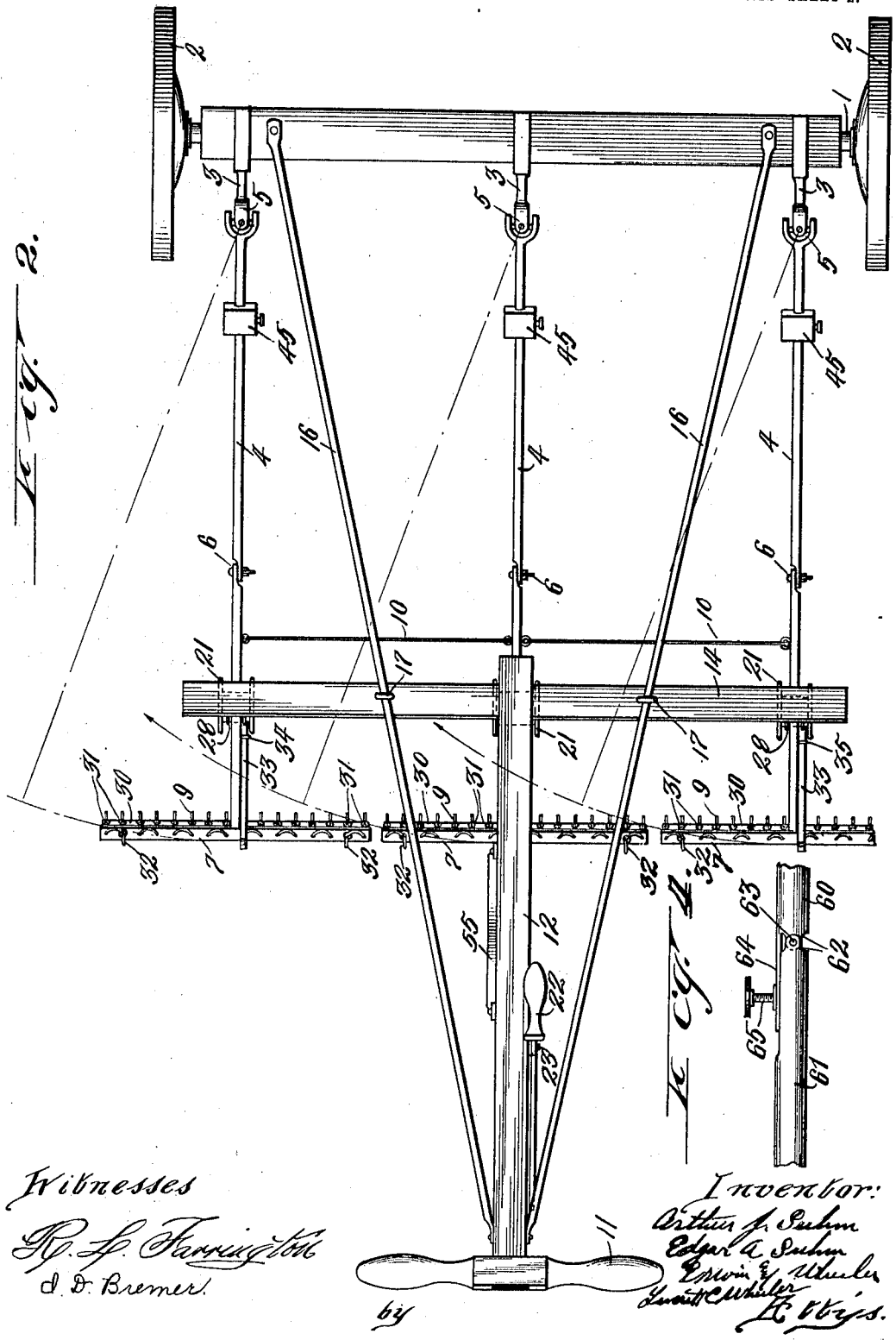

ARTHUR J. SUHM, OF MILWAUKEE, WISCONSIN, AND EDGAR A. SUHM, OF KANKAKEE, ILLINOIS.

WHEELED RAKE.

1,020,228.

Specification of Letters Patent.

Patented Mar. 12, 1912.

Application filed October 8, 1910. Serial No. 585,931.

*To all whom it may concern:*

Be it known that we, ARTHUR J. SUHM and EDGAR A. SUHM, citizens of the United States, residing at Milwaukee, county of Milwaukee, and State of Wisconsin, and at Kankakee, Kankakee county, Illinois, respectively, have invented new and useful Improvements in Wheeled Rakes, of which the following is a specification.

Our invention relates to improvements in hand rakes, designed especially for raking lawns, and also adapted to be used for raking and cultivating gardens, etc., and pertains especially to that class of rakes known as wheeled rakes.

The objects of our invention are to provide a form of construction which can be easily manipulated around corners and over irregular surfaces to which the rake teeth will to some extent be automatically adjusted, our invention also contemplating means to facilitate lifting the rake teeth and simultaneously cleaning them.

Our invention also has for its object, certain improvements in structural detail, the purpose of which will be apparent from the description.

In the following description, reference is had to the accompanying drawings, in which—

Figure 1 is a side view of a rake embodying our invention. Fig. 2 is a plan view of the same, showing a modified form of universal joint connection for the draw bars. Fig. 3 is a detail view of an end portion of one of the rake bars and the clearing bar or cleaner. Fig. 4 is a detail view, showing a modified form of joint for the draw bars.

Like parts are identified by the same reference characters throughout the several views.

The axle bar 1 is provided with wheels 2 and is also provided with rearwardly projecting arms 3, to which draw bars 4 are connected by universal joints at 5, whereby the draw bars 4 are not only permitted to swing upwardly and downwardly, but also are allowed to tilt or swing laterally. These bars 4 are each formed in sections, adjustably connected with each other by set bolts 6, the opposing surfaces of the bars being serrated to facilitate securing them rigidly in any position of adjustment. The abutting faces of the sections at this joint occupy a vertical place, thus permitting a variation in the pitch of the sections and in the consequent pitch of the rake teeth. The outer sections of the bars 4 are provided with cross heads 7, each constituting a back or head to which the rake teeth are secured. The rake teeth 9 are preferably formed of wire in a well known manner, each piece of wire being lowered or doubled upon itself to form a pair of teeth and the wires being passed through holes in the rake heads 7. Spacer links 10 connect the outer sections of the draw bars 4 with each other.

The device is propelled by means of a suitable handle 11 connected with a handle bar 12, which extends toward the central portion of the axle 1 and connects with a cross bar 14 for a purpose hereinafter described. The handle bar 12 is connected with the axle 1 by rods 16 extending diagonally from the handle bar at a point near the handle 11 to the outer end portions of the axle bar 1. These rods 16 are also secured to the cross bar 14 by staples or other suitable connections at 17.

A shaft 19 is supported from the cross bar 14 by suitable hanger brackets 20 and is provided with pulleys 21 fixedly secured to the shaft, one pulley 21 being located above each draw bar 4. A lever 22 is pivotally connected with the handle bar 12 at 23, and the lower end of the lever is connected with a chain or cable 24, the latter being wound around the central pulley 21 and extended downwardly to connect with the outer section of the central bar 4 at 25, so that by pulling the upper end of the lever 22 in the direction of the handle 11, the draw bar will be lowered until the rake teeth 9 are permitted to come in contact with the ground. But when the lever 22 is in the position illustrated in Fig. 1, the draw bar 4 will be held with the rake teeth in a raised position and the lever 22 may then be locked in this position by means of a hook 26, pivoted to the handle bar 12. The draw bars 4 at each side of the central bar, are each connected with the corresponding pulleys 21 at the outer ends of the shaft 19 by chains or cables 28, which are secured directly to the pulleys and to the respective draw bars. It is obvious that these outer pulleys 21 will be actuated by the chain or cable 24, since the latter is wound around the central pulley 21 and the motion of the central pulley will be transmitted to the side pulleys through the shaft 19, to which all of the pulleys are fixed.

A clearing or cleaning bar 30 is employed for each rake head 7, these clearing bars being provided with cleaning projections 31 extending between or around the rake teeth, eye screws being preferably employed, and arranged with the rake teeth passing through the eyes of the screws, said screws having threaded engagement with the bar 30. Links 32, at the respective ends of the bars 30, connect said bars loosely with the upwardly projecting or looped portions of the rake teeth above the rake heads 7, said links being each looped around one of the rake teeth above the rake head 7, and being of such a length as to allow the bar 30 to move downwardly nearly to the ends of the rake teeth without permitting the eye screws 31 to disengage from the teeth. In normal position of use, the clearing bars 30 will occupy a raised position relative to the rake teeth, in which position the bars 30 will be in close proximity to the bars 7. The bars 30 will be held in this position by springs 33. Each of these springs is connected at 34 with the outer section of a draw bar 4, and the outer end of each spring 33 is connected by an arm 35 with the clearing bar 30. Each of the springs 33 is connected by a chain or cable 37 with a downwardly extending axle bar arm 38, the chain or cable 37 being secured to the raised portion of the spring 33 at 39 and extended around pulleys 40 and 41 supported from the under side of the draw bar 4, so that when the draw bars 4 and rakes are lifted by the movement of the lever 22 to the position shown in Fig. 1, the chains or cables 37 will pull downwardly upon the outer or raised ends of the springs 33, depressing the springs and causing a relative downward movement of the clearing bar 30 to the position in which it is illustrated in Fig. 1, whereupon grass or other material adhering to the rake teeth will be removed by the pressure of the eye screws 31. When the draw bars 4 are again lowered, the clearing bars 30 will have a relative upward movement, due to the action of the springs 33, the rake teeth 9 passing downwardly through the eye screws into contact with the ground. The pressure of the rake teeth upon the ground is secured by means of weights 45, adjustably mounted upon the draw bars 4.

In Fig. 1 we have shown a ball and socket joint 5 for the draw bars. In Fig. 2 we have shown a double knuckle joint, which is made a universal joint by its swivel connection with the arms 3, thus permitting the rake heads to tilt rotatively.

In operation, the device will be pushed in front of the operator, the several rake heads tilting independently of each other, and conforming in their adjustment to the surface over which the rake teeth are passing, this tilting movement being permitted by the universal joints 5. In turning corners, the rakes will be permitted to retain a trailing position, each rake head swinging in the arcs indicated by dotted lines and arrow heads in Fig. 2. By loosening the set bolts 6, the angle of the rake teeth may be varied to suit the requirements of the work. When it is desired to dump the accumulated material, the several rakes will be simultaneously lifted by moving the lever 22 to the position indicated in Fig. 1, whereupon the rake teeth will be automatically cleared by the operation of the bar 30, as above described. When not in use, the rake teeth may be held in a raised position, as shown in Fig. 1, by means of a suitable support 55 connected with the handle bar 12.

In Fig. 4 we have illustrated a modification of the adjustable joint for connecting the sections of the draw bar 4. In this construction, the draw bar sections, comprising a pair of tubular members 60 and 61, are each provided with projecting lips 62 at their abutting ends, which lips are connected with each other by a cross pin 63. One of the sections, preferably the section 60, is provided with an arm 64, in which a set screw 65 has threaded engagement,— said set screw also having swiveled engagement with the section 61. By turning this set screw 64, the sections 60 and 61 may be either alined with each other, as shown in Fig. 4, or swung to any desired angle about the pivot pin 63.

It is sometimes desirable in a device of this class, to reverse the rake heads, using the loops of the rake teeth 9 instead of the points of said rake teeth. Where this is to be done, the several chains or cables 24 and 28 may be detached from their respective draw bars, and the cables 37 may be detached from the springs 33, whereupon each of the draw bars and the rake heads 7 may be rotated upon the universal joints 5 to bring the points of the teeth uppermost, after which the cables 24 and 28 may be reconnected, but the cables 37 will be left disconnected, since the clearing bar 30 operates only on the pointed portions of the teeth.

While we have shown and described our invention as including an axle bar 1 connected with wheels 2, especially prepared for this purpose, it is obvious that if desired, the wheels 2 may be dispensed with and the bar 1 connected to a lawn mower, the wheels of the latter furnishing the necessary support.

Various other modifications may be made without departing from the scope of our invention, it not being our intention by the descriptive terms herein employed, to exclude any mechanical equivalents for the parts shown and described.

Having thus described our invention, what we claim as new, and desire to secure by Letters Patent, is—

1. In a device of the described class, the combination with supporting wheels, of a transverse bar, a series of draw bars having ball and socket joint connection with said transverse bar adapted to permit a rotative movement of the draw bars, and a rake head connected with each of said draw bars and provided with rake teeth; together with a handle rigidly connected with said transverse bar;—said rake heads being free to tilt independently of each other and of said handle.

2. In a device of the described class, the combination with supporting wheels, of a transverse bar, a series of draw bars having universal joint connection with said transverse bar, and a rake head connected with each of said draw bars and provided with rake teeth, each of said draw bars being formed in sections adjustably connected with each other.

3. In a device of the described class, the combination with supporting wheels, of a transverse bar, a handle rigidly connected therewith, a series of draw bars having universal joint connection with said transverse bar, a rake head connected with each of said draw bars and provided with rake teeth, and spacing links connecting said draw bars;—said rake heads and draw bars being automatically tiltable rotatively independently of the handle.

4. In a device of the described class, the combination with supporting wheels, of a transverse bar, a series of draw bars having universal joint connection with said transverse bar, a rake head connected with each of said draw bars and provided with rake teeth, a handle rigidly connected with the first mentioned bar, a lever connected with the handle, and means, connected with said lever, for simultaneously lifting the rake heads.

5. In a device of the described class, the combination with supporting wheels, of a transverse bar, a series of draw bars having universal joint connection with said transverse bar, a rake head connected with each of said draw bars and provided with rake teeth, a handle rigidly connected with the first mentioned bar, a cross bar supported from the handle connections, a lever also connected with the handle, and means connected with said lever for simultaneously lifting the rake heads, said lifting means comprising a shaft rotatably supported from said cross bar, pulleys mounted on said shaft, a flexible connection between said lever and one of the pulleys, and a flexible connection between each of said pulleys and the draw bars.

6. In a device of the described class, the combination with a supporting bar, a set of draw bars having hinge joint connections therewith, rake heads connected with the rear ends of each draw bar and provided with rake teeth, a clearing bar for each rake head provided with clearing projections for the teeth, a spring secured to each draw bar and adapted to hold the respective clearing bars normally in a raised position, depending members connected with the supporting bar, flexible connections between said depending members and the supporting springs of the clearing bars, guide pulleys on the draw bars for said flexible connections, and means for swinging the draw bars to a raised position upon their hinged connections with the supporting bar, said supporting bar being adapted to be carried by supporting wheels.

7. In a device of the described class, the combination with supporting wheels, of a transverse bar, a draw bar, and a rake head connected with said draw bar and provided with rake teeth, said rake head being in universal joint connection with the transverse bar through the medium of the draw bar, and said universal joint connection being adapted to permit the rake head to tilt rotatively, horizontally and vertically.

8. In a device of the described class, the combination with supporting wheels, of a transverse bar, a draw bar having universal joint connection with the transverse bar, and a rake head connected with said draw bar and provided with rake teeth, together with a handled push bar, a lever pivotally connected therewith, and flexible connections between said lever and the rake head; said rake head being adapted to tilt to allow the rake teeth to conform to the surface of the ground.

In testimony whereof we affix our signatures in the presence of two witnesses.

ARTHUR J. SUHM.
EDGAR A. SUHM.

Witnesses as to the signature of Arthur J. Suhm:
LEVERETT C. WHEELER,
I. D. BREMER.

Witnesses as to the signature of Edgar A. Suhm:
FRANK O. SCHNEIDER,
FRED L. SCHNEIDER.